United States Patent
Kato et al.

(10) Patent No.: US 6,302,773 B1
(45) Date of Patent: Oct. 16, 2001

(54) POLISHING DEVICE, END FACE POLISHING APPARATUS HAVING POLISHING DEVICE, AND END FACE POLISHING METHOD

(75) Inventors: Mari Kato; Kouji Minami; Masaharu Sugiyama, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/360,774

(22) Filed: Jul. 26, 1999

(30) Foreign Application Priority Data

Apr. 19, 1999 (JP) .................................................. 11-111373

(51) Int. Cl.⁷ ...................................................... B24B 7/00
(52) U.S. Cl. .......................... 451/271; 451/270; 451/278; 451/444; 414/225.01; 414/796.9; 414/788.5
(58) Field of Search ................................ 451/41, 63, 259, 451/267, 268, 269, 270, 271, 278, 283, 444, 458; 414/225.01, 795.4, 796.9, 788.5

(56) References Cited

U.S. PATENT DOCUMENTS

| | | | |
|---|---|---|---|
| 5,660,581 | * | 8/1997 | Shin et al. ........................... 451/285 |
| 5,667,426 | * | 9/1997 | Minami et al. ....................... 451/41 |
| 5,676,590 | * | 10/1997 | Hiroka ............................... 451/289 |

FOREIGN PATENT DOCUMENTS

| | | |
|---|---|---|
| 3-26456 | 2/1991 | (JP) . |
| 7-27080 | 6/1995 | (JP) . |
| 8-57730 | 3/1996 | (JP) . |
| 10-15807 | 1/1998 | (JP) . |

* cited by examiner

Primary Examiner—Eileen P. Morgan
(74) Attorney, Agent, or Firm—Adams & Wilks

(57) ABSTRACT

An end face polishing apparatus comprises a polishing board and a jig board for supporting workpieces. A polishing member is detachably arranged on the polishing board and has a polishing film for polishing end faces of the workpieces while the workpieces are supported by the jig board. A first holding device holdings unused polishing members each having a new polishing film preliminarily attached thereto. At least one second holding device holds used polishing members which have been removed from the polishing board. A polishing member exchanging device is mounted for linear movement in horizontal and vertical directions for exchanging a used polishing member arranged on the polishing board with an unused polishing member by seizing the used polishing member from the polishing board and conveying the used polishing member to the second holding device, and by taking an unused polishing member from the first holding device and placing the unused polishing member on the polishing board.

19 Claims, 12 Drawing Sheets

POLISHING DEVICE, END FACE POLISHING APPARATUS HAVING POLISHING DEVICE, AND END FACE POLISHING METHOD

BACKGROUND OF THE INVENTION

1. Field of the invention

The present invention relates to an end face polishing apparatus for polishing an end face of a rod-like member such as a fiber for optical communication.

2. Description of the Related Art

A fiber for optical communication is used by fixedly adhering the fiber into a center hole of a ferrule which is a main member of a connector and polishing an end face of the ferrule and an end face of the fiber simultaneously to be flat and smooth to thereby finish them in mirror faces. When polished faces of the ferrule and the fiber which have been polished to finish are not faces orthogonal to a center axis of the ferrule or there causes a defect on the polished faces, in an optical connector where the ferrules are oppositedly connected, an accuracy in positions thereof opposed to each other is deteriorated and loss is enlarged. Accordingly, the polished face of the ferrule including the optical fiber needs to polish to finish in high accuracy.

There is disclosed a conventional optical fiber end face polishing apparatus in, for example, Japanese unexamined Patent No. 26456/1991. The optical fiber end face polishing apparatus disclosed in the publication, is provided with an eccentric board rotating on a concentric circle of a rotating circular board, the eccentric board is provided with planetary gears for transmitting rotation of a motor for revolution, these gears are coupled to a polishing board to thereby rotate and revolve the polishing board and in the meantime, end faces of a number of optical fibers held by a jig board are pressed to a polishing member fixed to the polishing board to thereby polish them.

Further, in respect of a ferrule, polishing operation of an end face thereof is carried out in a state of being fixed to the jig board and polishing powder or polishing solution (hereinafter, simply referred to as polishing powder) is adhered to a lower face and a side face of the jig board, an end portion of the ferrule and so on. In this case, conventionally, the jig board is turned upside down the ferrule fixedly held at the jig board, while spraying water supplied from a tap of water to predetermined portions, an operator rubs it by holding a cleaning brush or by using a cleaner whereby the end face of the ferrule and the jig board is cleaned.

As described above, according to the conventional optical fiber end face polishing apparatus, the polishing is carried out by pressing the end faces of a number of optical fibers held by the jig board to the polishing member fixed to the rotating and revolving polishing board. In this case, by a long period of use, the polishing member may clog and become unusable to necessitate interchange thereof or interchange with a polishing member having different roughness may be needed. However, according to the conventional polishing member, a polishing sheet is mounted on the polishing board via an elastic sheet and accordingly, operation of interchanging the polishing member is necessarily dependent on manual labor and there poses a problem in which operational efficiency is not excellent.

Further, polishing and cleaning of the ferrule is carried out by manual operation of the operator by using the above-described respectively independent polisher, cleaner and the like. Accordingly, there poses a problem in which mass production performance is deteriorated and the cost is high. Further, when the operator carries out the polishing operation, a more or less variation is caused in respective operation, for example, in setting urging force exerted on the ferrule in polishing operation or the like and there poses a problem in which the quality is not stabilized.

In view of such a situation, it is an object of the invention to provide an end face polishing apparatus achieving promotion of operational performance by automatically interchanging polishing members for polishing an end face of a ferrule, further, to provide an end face polishing and cleaning apparatus for automatically carrying out polishing and cleaning operation.

SUMMARY OF THE INVENTION

According to a first aspect of the invention, there is provided an end face polishing apparatus characterized in an end face polishing apparatus in which whereas a jig board mounted with a rod-like member is supported by an apparatus main body by a supporting mechanism, a polishing board mounted with a polishing member for polishing the rod-like member is supported by the apparatus main body rotatably and pivotably by a drive mechanism for polishing the rod-like member mounted to the jig board by the supporting mechanism by pressing the rod-like member to the rotating and pivoting polishing board, wherein the polishing member is mounted to the polishing board attachably thereto and detachably therefrom, further comprising an automatic interchanging device for interchanging the polishing member which is mounted to the polishing board and which has been used with the polishing member which is stored at a predetermined position and which is to be used.

According to a second aspect of the invention, there is provided the end face polishing apparatus according to the first aspect, characterized in that the automatic interchanging device comprises a moving member supported horizontally movably at a side of the polishing board, an elevating member elevatably supported by the moving member, a supporting arm in which whereas a base end portion thereof is fixed to the elevating member, a front end portion thereof is extended to above the polishing board and a supporting member attached to the front end portion of the supporting arm and capable of supporting the polishing member from below.

According to a third aspect of the invention, there is provided the end face polishing apparatus according to the second aspect, characterized in that whereas a flange portion is provided at an outer peripheral portion of the polishing member, the supporting member is engaged with the polishing member in a horizontal direction and capable of supporting the flange portion from below.

According to a fourth aspect of the invention, there is provided the end face polishing apparatus according to any one of the first through the third aspects, characterized in that a number of the polishing members which are to be used are laminated and mounted at a predetermined position.

According to a fifth aspect of the invention, there is provided the end face polishing apparatus according to any one of the first through the fourth aspects, characterized in that a number of the polishing members which are to be used are laminated and mounted at the predetermined position.

According to a sixth aspect of the invention, there is provided the end face polishing apparatus according to any one of the first through the fifth aspects, further comprising a plurality of recovering boxes for recovering the polishing members which have been used in accordance with kinds thereof.

According to a seventh aspect of the invention, there is provided the end face polishing apparatus according to any one of the first through the sixth aspects, characterized in that the supporting mechanism comprises a jig board supporting arm in which whereas a front end portion thereof holds the jig board, a base end portion thereof is supported movably in the up and down direction in a state in which the base end portion is extended to a side thereof and held substantially horizontally and elevating means for supporting the base end portion of the jig board supporting arm elevatably in the up and down direction and lowering the jig board supporting arm such that the rod-like member attached to the jig board is pressed to the polishing member by a predetermined pressure.

According to an eighth aspect of the invention, there is provided an end face polishing and cleaning apparatus characterized in that in the end face polishing apparatus according to the seventh aspect, further comprising a cleaner for cleaning a lower face of the jig board and the rod-like member attached to the jig board at a side of the polishing board, wherein the supporting mechanism comprises jig board moving means for reciprocally moving the jig board from the polishing board to the cleaner by moving the jig board supporting arm in the horizontal direction along with the elevating means.

According to a ninth aspect of the invention, there is provided the end face polishing apparatus according to the eighth aspect, characterized in that the cleaner comprises a cleaning brush for cleaning an end portion of the rod-like member and a lower face portion of the jig board by being rotationally moved in a state in which the cleaning brush is brought into contact with the lower face of the jig board.

According to a tenth aspect of the invention, there is provided the end face polishing apparatus according to any one of the first through the ninth aspects, characterized in that a drive mechanism of the polishing board is revolved while being rotated in a state in which the jig board is mounted.

According to an eleventh aspect of the invention, there is provided the end face polishing apparatus according to the tenth aspect, characterized in that the drive mechanism of the polishing board comprises stop position controlling means for stopping the polishing board at a predetermined position.

According to the invention, in exchanging the polishing members, the automatic interchanging device automatically interchanges the polishing member mounted to the polishing board with the polishing member stored at the predetermined position and promotion of operational performance is achieved.

DETAILED DESCRIPTION OF THE PREFERRED EMBODIMENTS

A detailed explanation will be given of embodiments of the invention in reference to drawings as follows.

Figure 1:
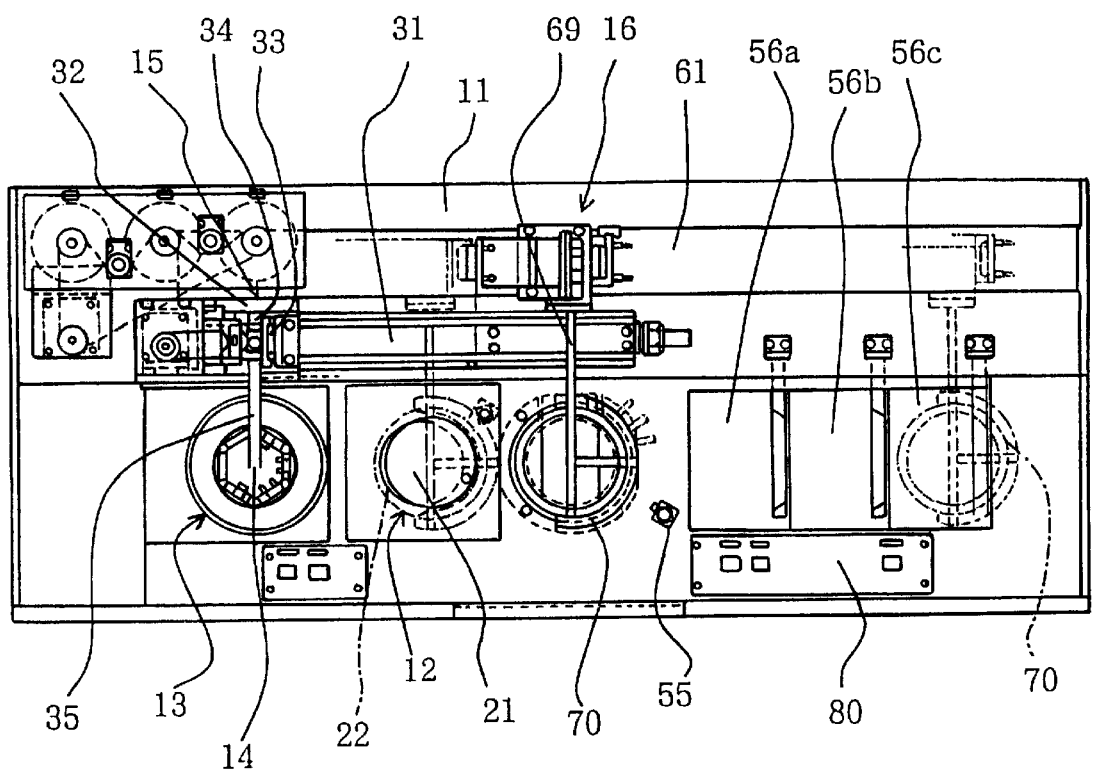
FIG. 1 is a plane view of an end face polishing apparatus according to an embodiment of the invention.
Figure 2:
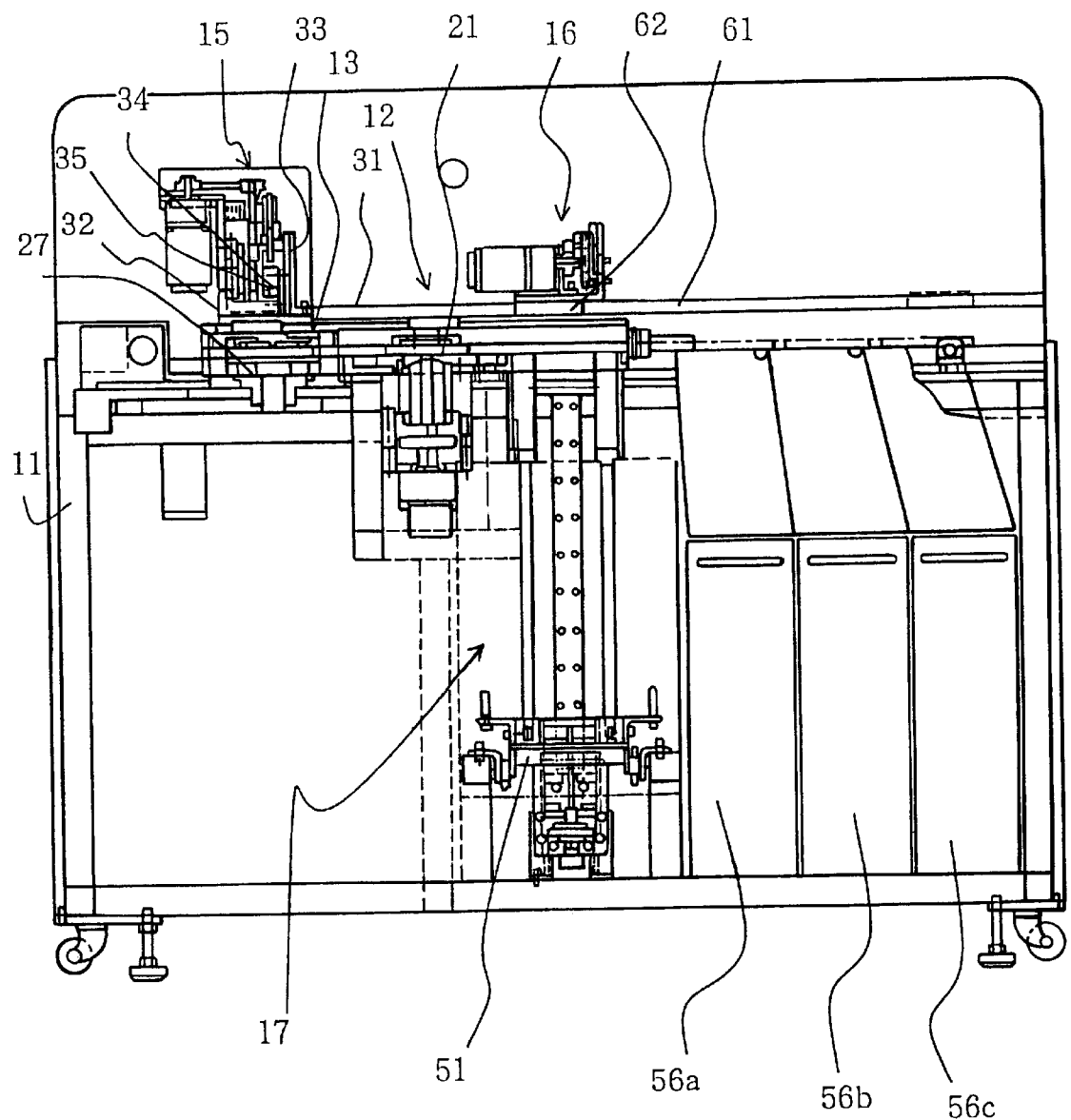
FIG. 2 is a front view of the end face polishing apparatus.
Figure 3:
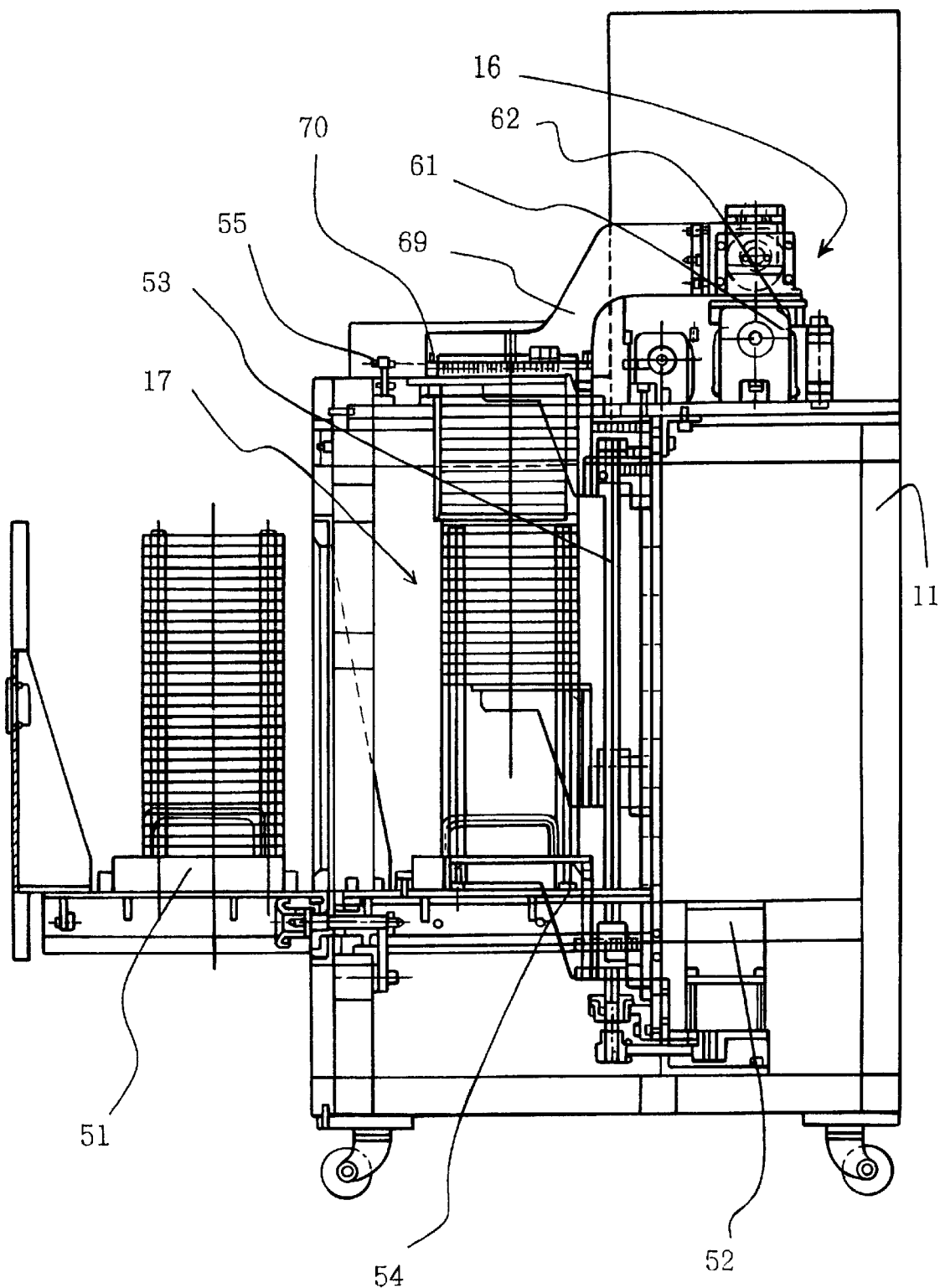
FIG. 3 is a side view of the end face polishing apparatus.
Figure 4:
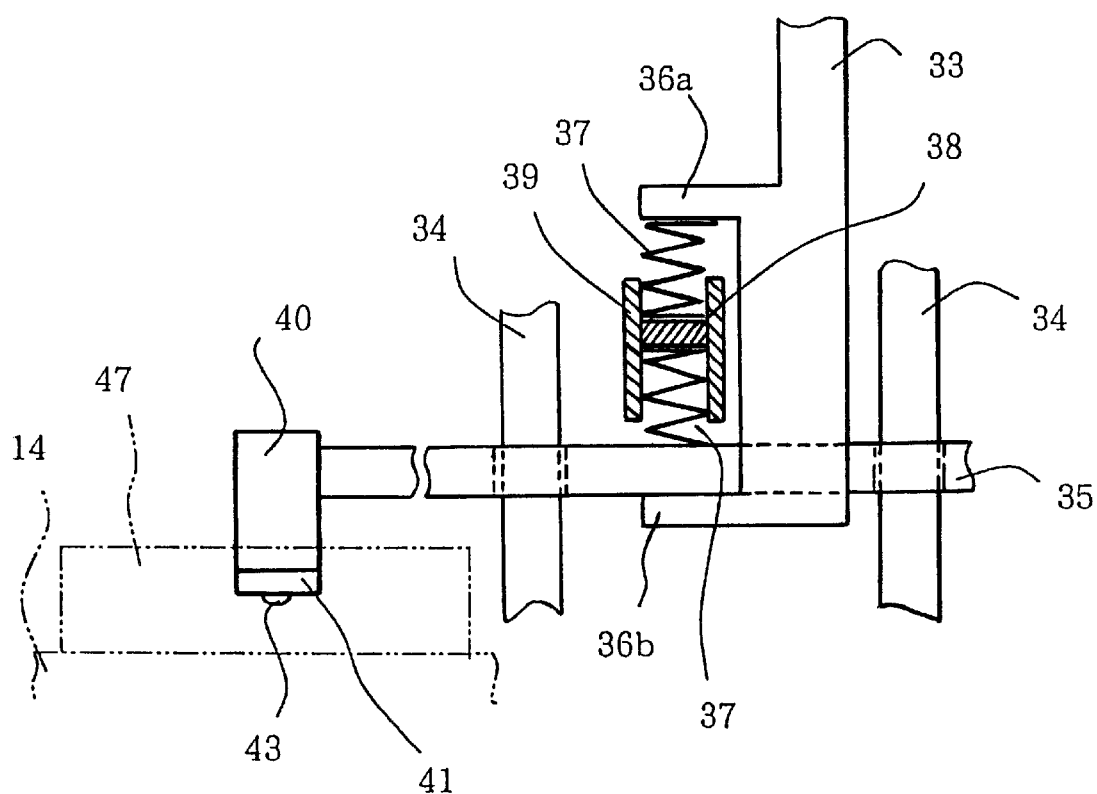
FIG. 4 is an outline view of a supporting mechanism of a jig board.
Figure 5:
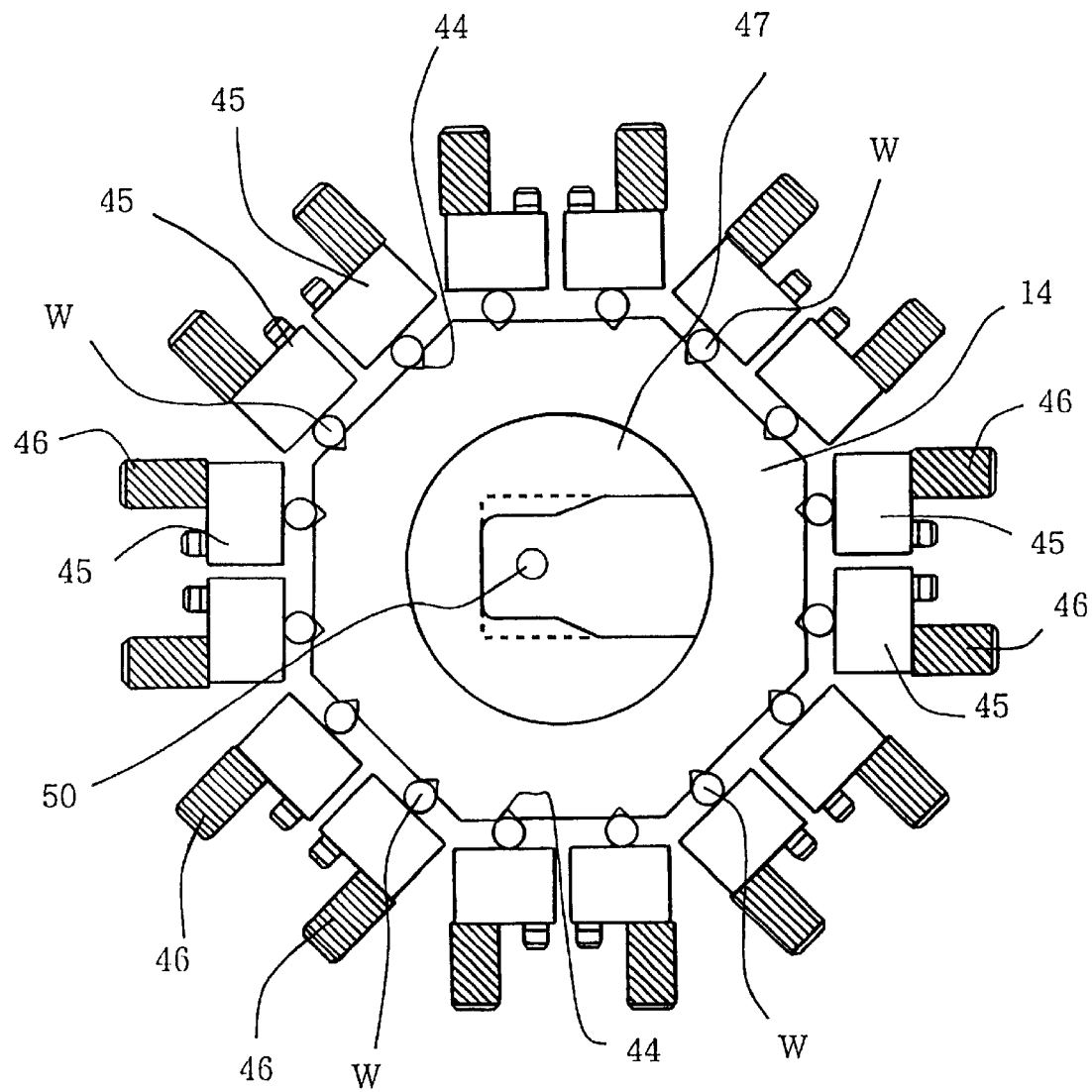
FIG. 5 is a plane view of the jig board.
Figure 6:
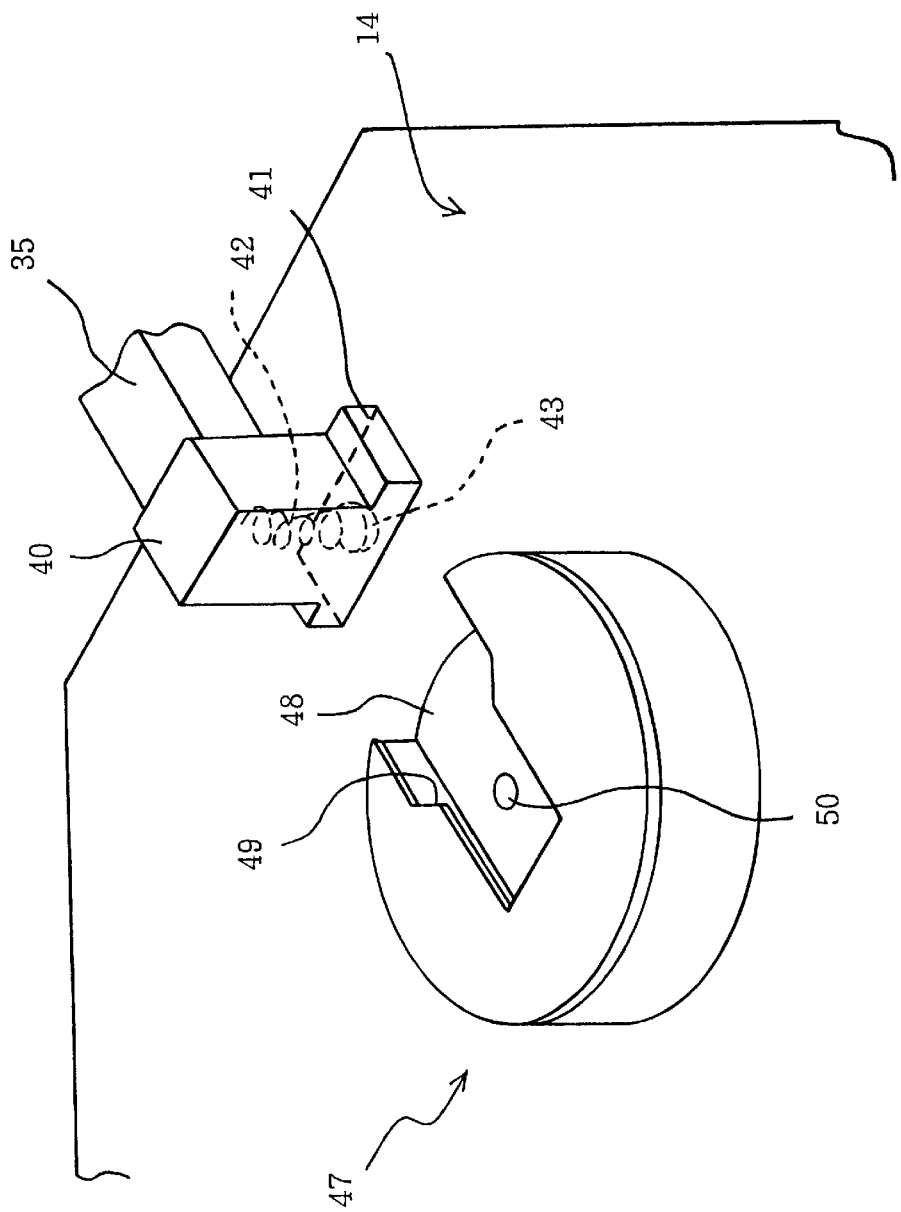
FIG. 6 is an outline view representing a state of engaging the supporting mechanism and the jig board.
Figure 7:
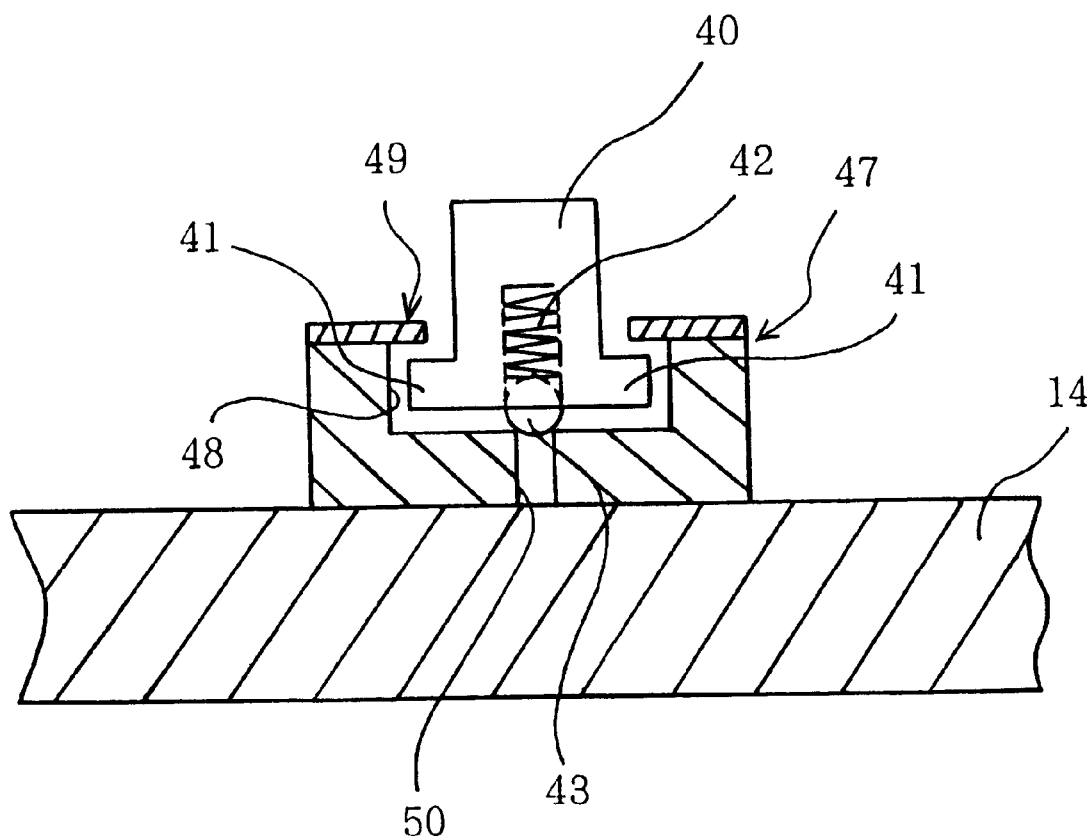
FIG. 7 is a sectional view representing a state of engaging the supporting mechanism and the jig board.
Figure 8:
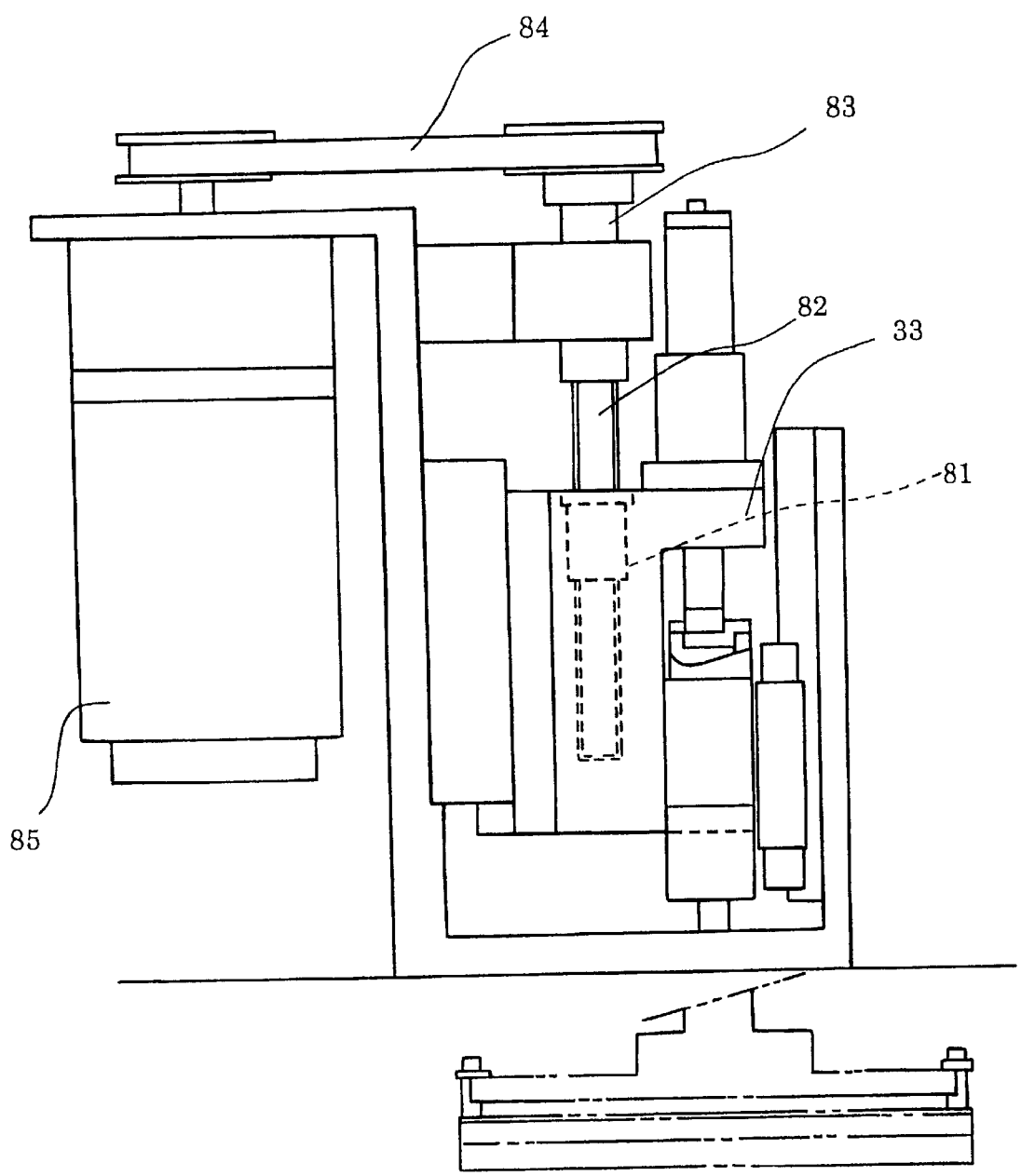
FIG. 8 is an outline view of a supporting mechanism portion.
Figure 9:
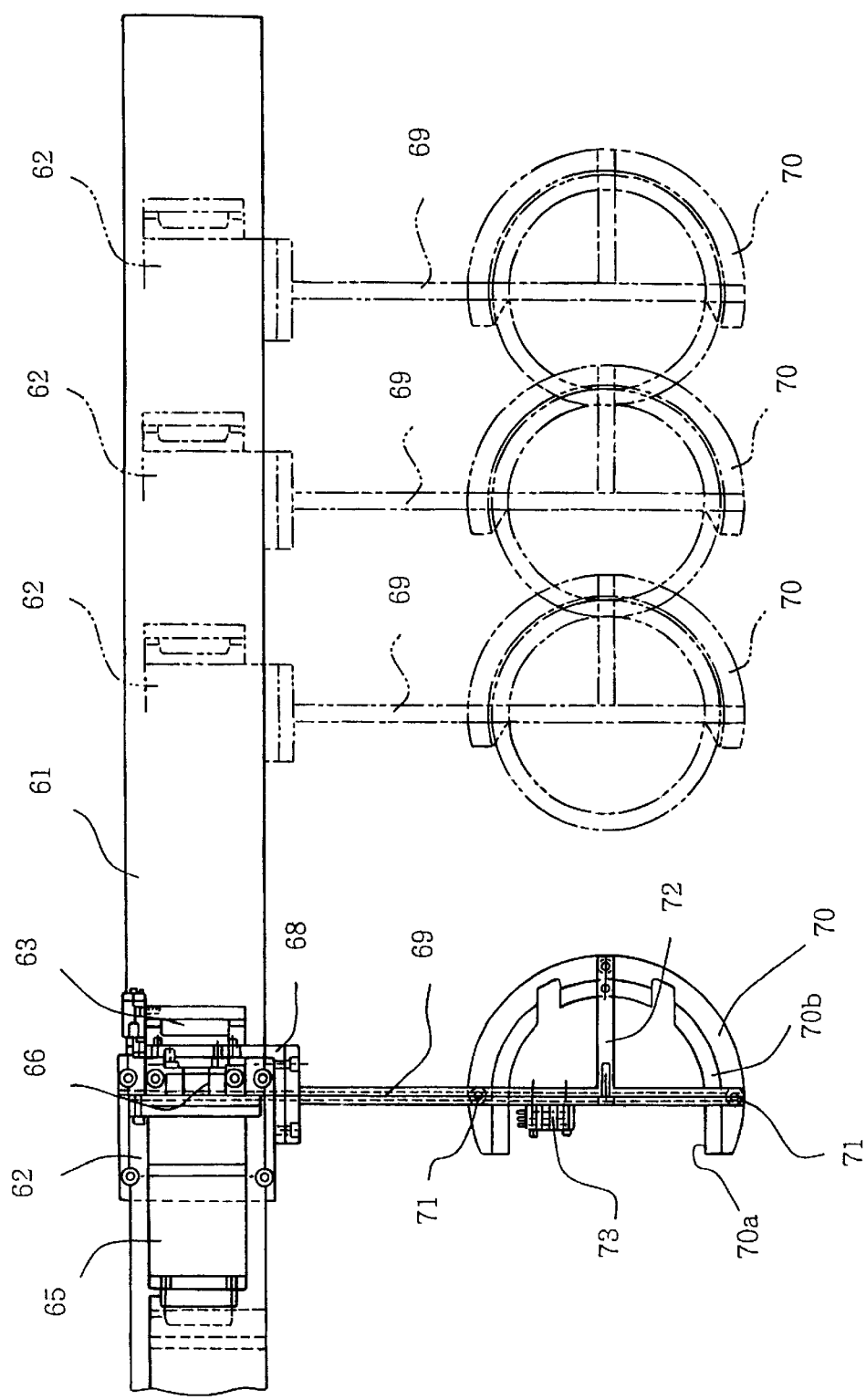
FIG. 9 is a plane view of an automatic interchanging device of a polishing member.
Figure 10:
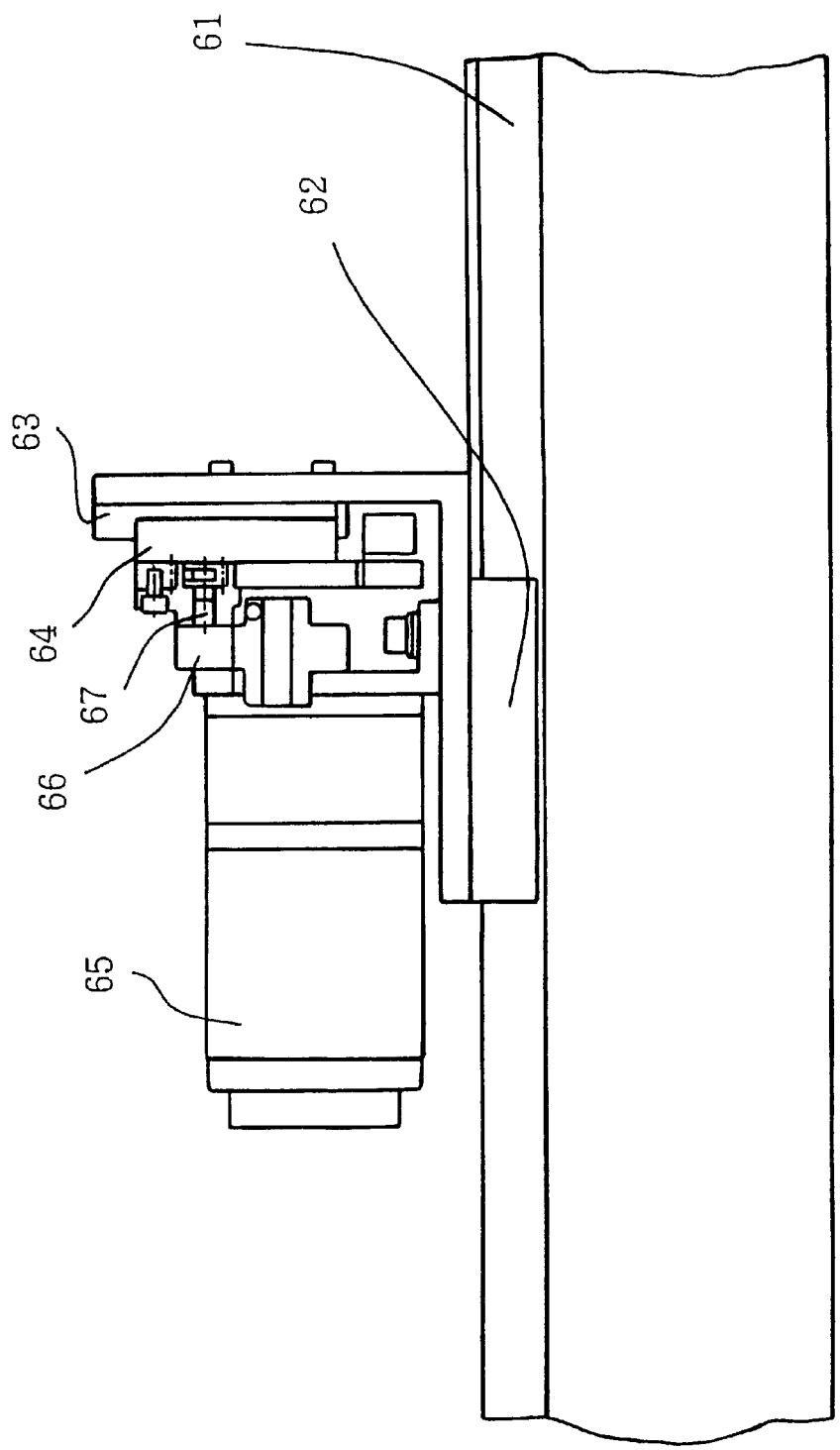
FIG. 10 is an outline view representing a drive unit of the automatic interchanging device of the polishing member.
Figure 11:
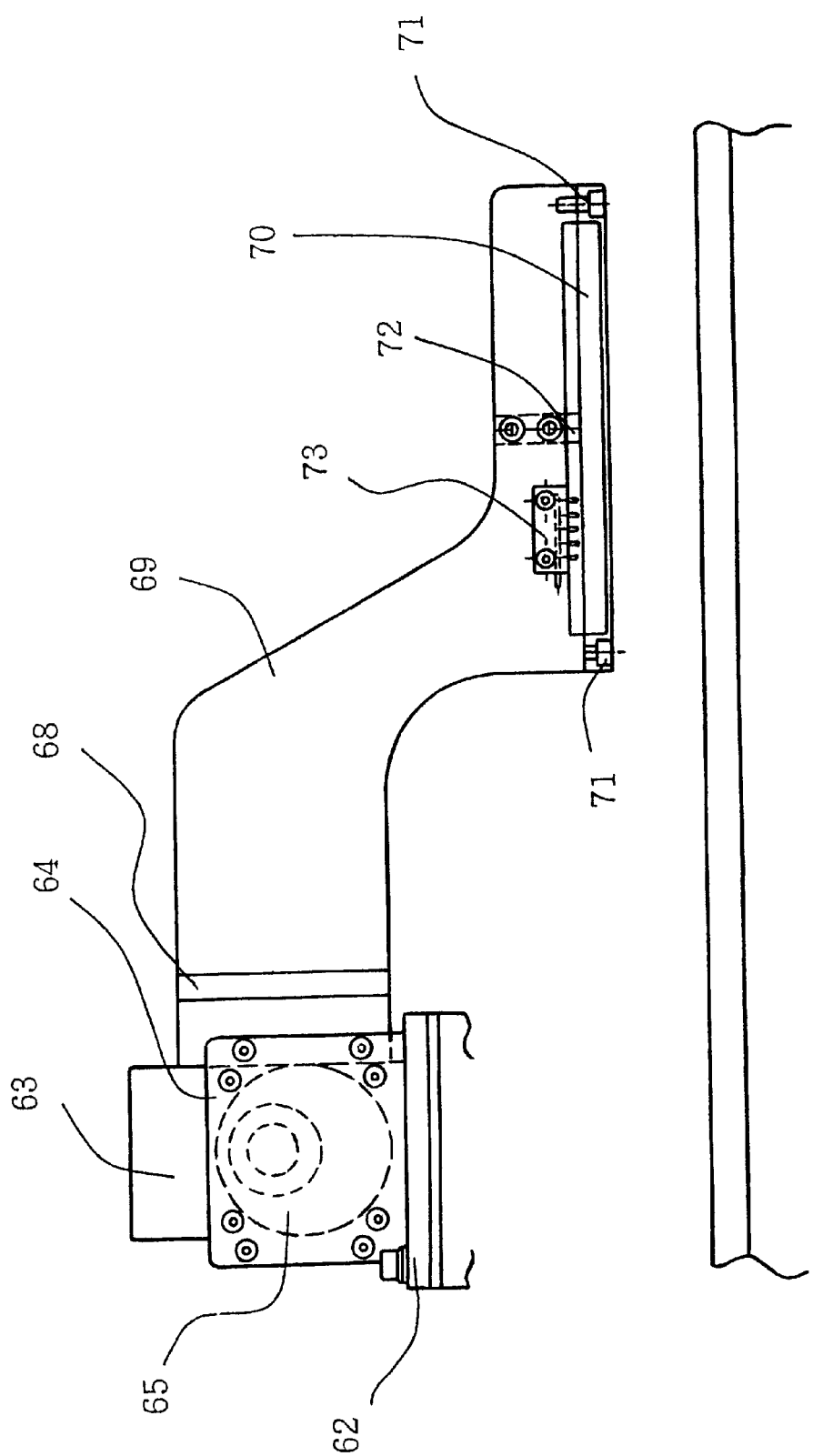
FIG. 11 is an outline view of a supporting arm of the polishing member.
Figure 12:
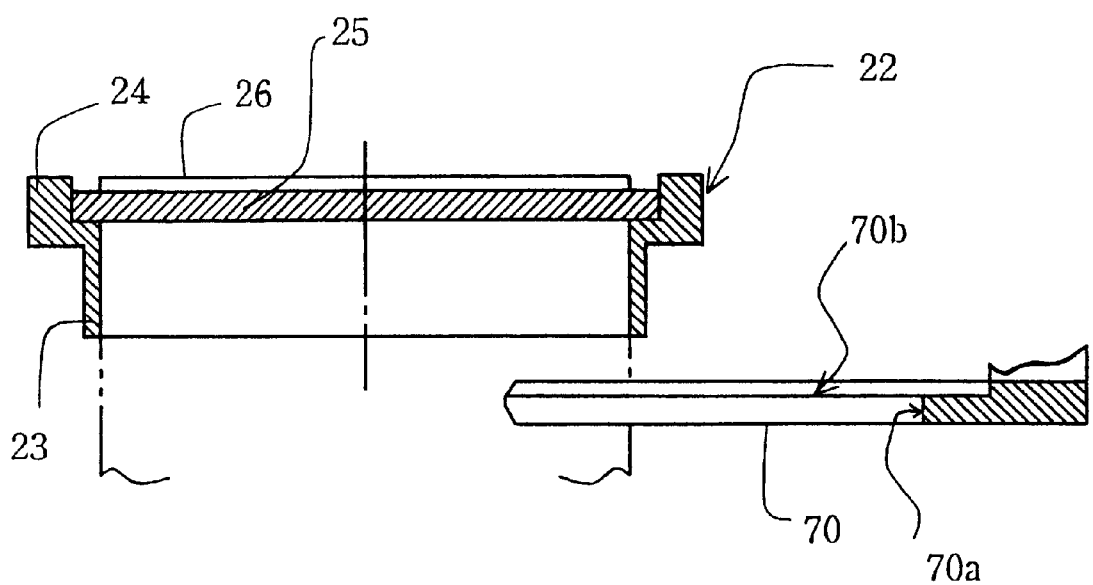
FIG. 12 is an outline view representing a state of engaging the polishing member by the supporting member.

FIG. 1 shows a plane view of an end face polishing apparatus according to an embodiment of the invention, FIG. 2 shows a front view of the end face polishing apparatus, FIG. 3 shows a side view of the end face polishing apparatus, FIG. 4 shows an outline view of a supporting mechanism of a jig board, FIG. 5 shows a plane view of the jig board, FIG. 6 shows an outline view representing a state of engaging the supporting mechanism and the jig board, FIG. 7 shows a sectional view representing the state of engaging the supporting mechanism and the jig board, FIG. 8 shows an outline view of the supporting mechanism, FIG. 9 shows a plane view of an automatic interchanging device of the polishing member, FIG. 10 shows an outline view representing a drive unit of the automatic interchanging device of the polishing member, FIG. 11 shows an outline view of a supporting arm of the polishing member and FIG. 12 shows an outline view representing a state of engaging the polishing member by a supporting member.

According to the end face polishing apparatus of the embodiment, as shown in FIG. 1 through FIG. 3, an apparatus main body 11 is installed with a polisher 12, a cleaner 13, a jig board 14 for fixing a plurality of ferrules as rod-like members, a supporting device 15 for movably supporting the jig board 14, an automatic exchanging or interchanging device 16 for interchanging polishing members of the polisher 12 and a holding device or containing magazine 17 for containing the polishing members to be interchanged.

The polisher 12 carries out polishing of a front end of a ferrule by rotating a polishing board 21 arranged on the apparatus main body 11 while revolving it. The polishing board 21 can carry out revolving movement by a predetermined eccentric amount by driving a motor for revolution, not illustrated, and the polishing board 21 can be rotated by driving a motor for rotation, not illustrated. Further, according to the embodiment, there is installed stop position controlling means, not illustrated, for controlling such that a position of stopping the revolution motor is disposed always at a constant position.

As shown in FIG. 12, an upper portion of the polishing board 21 is integrally and rotatably fitted with a polishing member 22 in a shape of a circular board. The polishing member 22 comprises a fitting portion 23 in a ring-like shape and a flange portion 24 formed at an upper portion of the fitting portion 23 and the upper portion is attached with a polishing film 26 via an elastic member 25 in a circular shape. Further, the fitting portion 23 and the elastic member 25 are molded by a plastic and the elastic member 25 adhered to the flange portion 24.

Further, the elastic member 25 is a rubber sheet comprising a material of, for example, CR, silicone, urethane, NBR, natural rubber, SBR or the like and having a thickness of, for example, about 2 mm and is fixedly attached to the flange portion of the frame member 1 by an adhesive agent or the like. A surface at least on an outer side of the elastic member 25 fixedly attached to the frame member 1 is finished into a mirror face having a surface roughness of, for example, Ra 1.6 μm or smaller.

Further, the polishing film 26 is mounted on the elastic member 25. The polishing film 26 is only mounted on the elastic member 25 without interposing an adhesive agent or the like between the polishing film 26 and the elastic member 25 and no adhesive agent or the like is used therebetween. However, the surface of the elastic member 2 is finished into a mirror face and accordingly, the polishing film 26 is sufficiently adhered onto the surface of the elastic member 25.

Further, although according to the embodiment, the fitting portion 23 as well as the flange portion 24 and the elastic member 25 are constituted as separate members, these may be integrally molded by an elastic member of rubber or the like.

Such a polishing member 22 is mounted to an upper portion of a polishing board 21 of an end face polishing apparatus. A ferrule is brought into contact with the polishing film 26 and the polishing board 21 is rotated to thereby polish a front end face of the ferrule. A detailed description thereof will be given later.

Further, as shown in FIG. 1 and FIG. 2, the cleaner 13 is installed contiguous to the polisher 12 on the apparatus main body 11 and can clean polishing powder attached to an end face of the ferrule and the jig board 14 by rotating and revolving three of cleaning brushes 27 by a drive motor, not illustrated.

Further, the jig board 14 can be fixed with a plurality of the ferrules and is made movable along a direction of installing the polisher 12 and the cleaner 13 in parallel with each other by the supporting device 15. That is, a movement rail 31 is fixed along the direction of installing the polisher 12 and the cleaner 13 in parallel with each other above the apparatus main body 11, a moving frame 32 is supported movably by the movement rail 31 and an elevating frame 33 is elevatably supported by the movement frame 32.

Further, as shown in FIG. 4 through FIG. 6, the moving frame 32 is fixed with a pair of vertical guides 34, a base end portion of a supporting elementor arm 35 is elevatably supported by the vertical guides 34 and the supporting arm 35 is penetrated movably in the up and down direction between upper and lower flange portions 36a and 36b integrally formed with a lower end portion of the elevating frame 33. Further, the supporting arm 35 is supported to be urged downwardly by two of compression springs 37 relative to the elevating frame 33 and an intermediary between the two conventional springs 37 is mounted with a load cell 38 for detecting their load. Further, the elevating frame 33 is attached with a guide 39 in a cylindrical shape for supporting the compression springs 37 and the load cell 38.

Meanwhile, a front end portion of the supporting arm 35 is fixed with a holding block 40 for holding the jig board 14 and the holding block 40 is integrally formed with a positioning portion 41 and attached with a holding ball 43 supported to be urged by a compression spring 42.

The jig board 14 is formed in an octagonal shape in plane view, installed with attachment pieces 45 opposed to a number of V grooves 44 formed at an outer peripheral portion thereof and the attachment pieces 45 are fixed to the jig board 14 by fixing screws 46 while interposing ferrules W between the V grooves 44 and the attachment pieces 45 by which the ferrules can be interposed by the V grooves 44 and the attachment pieces 45. Further, a boss portion 47 is formed at a central portion of an upper face of the jig board 14 and a central portion thereof is formed with an opening portion 48 into which the holding block 40 can be inserted from a side direction. Further, engaging flanges 49 are formed integrally with both sides of an upper portion of the opening portion 48 and a positioning hole 50 is formed at a central portion thereof.

Therefore, as shown in FIG. 7, by inserting the holding block 40 into the opening portion 48 of the boss portion 47 and engaging the holding ball 43 supported to be urged by the compression spring 42 with the positioning hole 50, and positioning of the jig board 14 relative to the supporting arm 35 is carried out and the positioning portions 41 are engaged with the engaging flanges 49 by which the supporting arm 35 can pivotably hold the jig board 14.

By moving the moving frame 32 along the movement rail 31, the jig board 14 held by the supporting arm 35 can be moved between the polisher 12 and the cleaner 13 and by lowering the elevating frame 33 at the respective positions, polishing operation and cleaning operation of the held ferrules W can be carried out.

Further, as shown in FIG. 8, the elevating frame 33 is integrally installed with a nut 81 which is in mesh with a screw spindle 82. Further, a vertical shaft 83 installed integrally with an upper portion of the screw spindle 82 is connected to a pressurizing motor 85 via a transmission member 84 of a rubber belt or the like.

Therefore, by lowering the elevating frame 33 by rotating the vertical shaft 83 in one direction and pressing the ferrules W to an upper face of the polishing member 22 (polishing film 26) of the rotating and revolving polishing board 21, polishing of the end faces of the ferrules W is carried out. Further, by pressing the ferrules W to the respective rotating and revolving cleaning brushes 27, cleaning of the end faces of the ferrules W and the jig board 14 is carried out.

Further, as shown in FIG. 1 through FIG. 3, the automatic interchanging device 16 can automatically interchange the polishing member 22 mounted to the polisher 12 with a polishing member to be used successively and contained in the containing magazine 17. The containing magazine 17 is installed contiguous to the polisher 12. A laminating portion 51 laminated with a number of polishing members in an order of a use schedule is supported movably in the side direction relative to the main body and an elevating base 54 can be elevated by rotating a screw shaft 53 by driving a drive motor 52. Further, the elevating base 54 is elevated by driving the drive motor 52 in accordance with a detection sensor 55 installed at an upper portion thereof and a polishing member at an uppermost position laminated to the laminating portion 51 is disposed always at the same height.

Further, there are installed three of holding devices or collecting cases 56a, 56b and 56c for collecting the polishing members 22 removed from the polisher 12 in accordance with kinds thereof contiguous to the containing magazine 17. In this case, the collecting cases 56a, 56b and 56c are for facilitating to reuse the polishing members to be reused by recovering them in accordance with, for example, roughness of mesh. Further, the polishing members not to be reused may be recovered by a prescribed collecting case regardless of roughness of mesh.

Meanwhile, as shown in FIG. 9 through FIG. 11, an upper portion of the apparatus main body 11 is fixed with a horizontal rail 61 in parallel with a direction of installing the polisher 12, the containing magazine 17 and the collecting cases 56a, 56b and 56c, a moving member 62 is movably supported by the horizontal rail 61, the moving member 62 is fixed with a vertical rail 63 and an elevating member 64 is elevatably supported by the vertical rail 63. Further, the moving member 62 is mounted with an elevating motor 65 and an eccentric cam shaft 67 of a rotating member 66 rotated by the elevating motor 65 is engaged with the elevating member 64.

Further, the elevating member 64 is fixed with a base end portion of a supporting arm 69 extended to the side of the polisher 12 via an attachment bracket 68. Meanwhile, a side of a front end portion of the supporting arm 69 is bent downwardly. At the front end portion a supporting member 70 formed in a shape of a semicircular arc in plane view is attached by attaching bolts 71 and supported by a supporting rod 72. Further, a detection sensor 73 is mounted to the front end portion of the supporting arm 69.

The supporting member 70 can transport the polishing member 22 mounted to the polishing board 21 of the polisher 12 by supporting it from below to the collecting cases 56a, 56b and 56c and can transport the polishing member disposed at the uppermost portion of the containing magazine 17 by supporting it from below to the polishing board 21. That is, as shown in FIG. 12, according to the supporting member 70, an inner diameter portion 70a thereof is attachable and detachable to and from the engaging portion 23 of the polishing member 22 and by elevating the supporting member 70 in a state in which the inner diameter portion 70a is engaged with the engaging portion 23, an upper face portion 70b thereof is brought into contact with the flange portion 24 and the polishing member 22 can be lifted.

Further, an upper face of the apparatus main body 11 is installed with an operation panel 80 for operating the polisher 12, the cleaner 13, the jig board 14 as well as the supporting device 15, the automatic interchanging device 16 and so on of the end face polishing apparatus.

Here, an explanation will be given of the operation of polishing and cleaning the end portion of the ferrule and operation of interchanging the polishing members by using the end face polishing apparatus according to the invention constituted as described above.

According to the end face polishing apparatus of the embodiment, as shown in FIG. 1 through FIG. 3, respective operations other than attachment and detachment of the ferrule W to and from the jig board 14 and attachment and detachment of the jig board 14 to and from the supporting device 15 are all carried out by the operation panel 80. Therefore, when the ferrules W and the jig board 14 are attached and inputting operation to the operational panel 80 is carried out by the operator, firstly, the jig board 14 is horizontally moved by the supporting device 15 and moved to the central axis of the polishing board 21 on the polisher 12, successively the jig board 14 is lowered to a predetermined position. The predetermined position is a position for bringing the end face of the ferrule into contact with the polishing member 22 (polishing film 26) mounted on the polishing board 21 by predetermined load. Thereafter, by operating the polisher 12 and rotating the polishing member 22 along with the polishing board 21 as described above, the end face of the ferrule is polished to a predetermined shape.

When polishing of the end face of the ferrule has been finished, the jig board 14 is moved to above the cleaner 13 by the supporting device 15 and the jig board 14 is lowered again to a predetermined position. The predetermined position is a position of bringing the end face of the ferrule into contact with the cleaning brushes 27 of the cleaner 13 by predetermined load. Further, when the ferrule is arranged at the predetermined position, by operating the cleaner 13 and cleaning the end face of the ferrule and the jig board 14 as described above, a series of operations are completed.

The operation of polishing and cleaning the end face of the ferrule can continuously be carried out only by automatically moving the jig board 14 in a shape of inverse U by repeating horizontal movement and vertical movement thereof in this way.

Further, when the polishing operation needs to carry out in several stages, the polishing members 22 are interchanged by the automatic interchanging device 16 and the same operation is repeated by a necessary number of times.

In this case, firstly, the moving member 62 is moved along the horizontal rail 61 to thereby dispose the supporting member 70 at an upper portion of a side portion of the polishing member 22 of the polisher 12, successively, the elevating member 64 is lowered along the vertical rail 63 by which as shown in FIG. 12, the supporting member 70 is disposed at a side of the polishing member 22. Further, by moving the moving member 62 horizontally under the state and moving the supporting member 70 to the side of the polishing member 22, the inner diameter portion 70a is engaged with the engaging portion 23 of the polishing member 22 from a side direction, successively, the elevating member 64 is lifted by which the upper face portion 70b is brought into contact with the flange portion 24 and draws and lifts the polishing member 22 from the polishing board 21.

When the supporting member 70 supports the polishing member 22, the moving member 62 is horizontally moved to thereby transport the polishing member 22 supported by the supporting member 70 to the collecting cases 56a, 56b and 56c. At this occasion, the supporting member 70 drops the polishing member 22 into a predetermined one of the collecting cases 56a, 56b and 56c.

When the polishing member 22 mounted to the polishing board 21 is removed in this way, the moving member 62 is horizontally moved to the containing magazine 17 along the horizontal rail 61 and by operation similar to the above-described, the supporting member 70 supports the polishing member disposed at the uppermost portion of the containing magazine 17. Further, again, the moving member 62 is horizontally moved to the polisher 12, the polishing member supported by the supporting member 70 is disposed to above the polishing board 21 of the polisher 12 and the elevating member 64 is lowered along the vertical rail 63 by which the polishing member 22 supported by the supporting member 70 is mounted to the polishing board 21. Thereafter, the supporting member 70 is horizontally moved, lifted and escaped.

In this way, according to the end face polishing apparatus of the embodiment, when the polishing member 22 mounted to the polishing board 21 of the polisher 12 is interchanged by other member, the automatic interchanging device 16 draws the polishing member 22 of the polishing board 21 and carries it to the collecting cases 56a, 56b and 56c and in the meantime, other polishing member is transported from the containing magazine 17 to the polisher 12 and is mounted to the polishing board 21 by which the polishing member can be interchanged automatically.

[Effect of the Invention]

As has been explained in details in respect of the embodiment, according to the end face polishing apparatus of the invention, there is provided an end face polishing apparatus in which a jig board mounted with a rod-like member is supported by an apparatus main body by a supporting mechanism, a polishing board mounted with a polishing member for polishing the rod-like member is supported by the apparatus main body rotatably and pivotably by a drive mechanism for polishing the rod-like member mounted to the jig board by the supporting mechanism by pressing the rod-like member to the rotating and pivoting polishing board, and the polishing member is mounted to the polishing board attachably thereto and detachably therefrom. The invention further comprises an automatic interchanging device for interchanging the polishing member which is mounted to the polishing board and which has been used with the polishing member which is stored at a predetermined position and which is to be used. Accordingly, when the polishing members are interchanged, the automatic interchanging device automatically interchanges the polishing member mounted to the polishing board with the polishing member stored at the predetermined position and promotion of operational performance can be achieved.

Further, according to the end face polishing apparatus of the invention, particularly, whereas the flange portion is provided at the outer peripheral portion of the polishing member, the supporting member is engaged with the polishing member in the horizontal direction to be capable of supporting the flange portion from below, in the meantime, the moving member is supported horizontally movably at the side of the polishing board, the elevating member is elevatably supported by the moving member, the supporting arm the front end portion of which is extended to above the polishing board is fixed to the elevating member, the supporting member capable of supporting the polishing member from below is attached to the front end portion of the supporting arm and therefore, interchanging of the polishing members can be carried out only by simple movement in the up and down, and right and left directions.

Further, the polishing member is constituted by the fitting portion having the frame shape surrounding the upper portion of the polishing board and the flange portion being integrally molded with the fitting portion, the elastic member fixedly attached to the flange portion of the frame member and the polishing film mounted on the upper face of the elastic member. Accordingly, when the polishing film is interchanged, the polishing film is interchanged together with the polishing member and therefore, the polishing solution needs not to wipe off and the operational efficiency can be promoted.

Further, the surface of the elastic member is finished into a mirror face and accordingly, the polishing sheet can firmly be adhered onto the elastic member by only mounting the polishing sheet thereon without using an adhesive agent or the like and the polishing film does not shift to drop during polishing and rotating operation. Further, the polishing film can also be peeled off and can be interchanged with ease.

What is claimed is:

1. An end face polishing apparatus comprising: a polishing board mounted for undergoing rotational movement and for supporting a polishing member having an upper surface supporting a polishing film and a lower surface; and a polishing member exchanging device for exchanging the polishing member with another polishing member having an upper surface supporting a polishing film and a lower surface, the polishing member exchanging device having a movable member for undergoing linear movement in a horizontal direction, an elevating member supported by the movable member for undergoing linear movement therewith in the horizontal direction and for undergoing linear movement in a vertical direction, a support arm having a first end portion connected to the elevating member for undergoing movement in the horizontal and vertical directions and a second end portion, and a support member connected to the second end portion of the support arm for undergoing linear movement in the horizontal and vertical directions and for supporting the polishing members from the lower surfaces thereof during the exchange of the polishing members.

2. An end face polishing apparatus according to claim 1; wherein each of the polishing members has a flange portion disposed at an outer peripheral portion of the lower surface thereof so that the support member engages the flange portion of the polishing member during the exchange of the polishing members.

3. An end face polishing apparatus comprising: a polishing board for detachably supporting a polishing member; a first holding device for holding at least one unused polishing member having an upper surface supporting a polishing film and a lower surface; at least one second holding device for holding at least one used polishing member having an upper surface supporting a used polishing film and a lower surface, the used polishing member being removed from the polishing board; and a polishing member exchanging device for exchanging the used polishing member supported on the polishing board with an unused polishing member by removing the used polishing member from the polishing board and conveying the used polishing member to the second holding device, and by taking the unused polishing member from the first holding device and placing the unused polishing member on the polishing board, the polishing member exchanging device having a movable member supported for undergoing linear movement in a horizontal direction, an elevating member supported by the movable member for undergoing linear movement therewith in the horizontal direction and for undergoing linear movement in a vertical direction, a support arm having a first end portion connected to the elevating member for undergoing movement in the horizontal and vertical directions and a second end portion, and a support member connected to the second end portion of the support arm for undergoing linear movement in the horizontal and vertical directions and for supporting each of the used polishing member and the unused polishing member from the lower surface thereof during the exchange of the polishing member.

4. An end face polishing apparatus according to claim 3; wherein the at least one used polishing member comprises a plurality of used polishing members.

5. An end face polishing apparatus according to claim 4; wherein the at least one unused polishing member comprises a plurality of unused polishing members.

6. An end face polishing apparatus according to claim 3; wherein the at least one used polishing member comprises a plurality of used polishing members varying in kind; and wherein the at least one second holding device comprises a plurality of second holding devices each for holding the used polishing members in accordance with the kind thereof.

7. An end face polishing apparatus according to claim 6; wherein the at least one unused polishing member comprises a plurality of unused polishing members.

8. An end face polishing apparatus according to claim 3; further comprising: a jig board for supporting at least one workpiece having an end face; and a movable support mechanism for supporting the jig board and for moving the jig board to bring the end face of the workpiece into pressure contact with the polishing film of the polishing member supported by the polishing board.

9. An end face polishing apparatus according to claim 8; wherein the at least one workpiece comprises a plurality of workpieces.

10. An end face polishing apparatus according to claim 9; wherein each of the workpieces comprises a generally rod-shaped member.

11. An end face polishing apparatus according to claim 8; wherein the workpiece comprises a generally rod-shaped member.

12. An end face polishing apparatus according to claim 8; wherein the movable support mechanism comprises a support element having a first end connected to the jig board and a second end opposite the first end, and movable means connected to the second end of the support element for moving the support element and the jig board in the vertical direction to bring the end face of the workpiece into pressure contact with the polishing film of the polishing member supported by the polishing board to polish the end face of the workpiece.

13. An end face polishing apparatus according to claim 12; further comprising a cleaning section for cleaning a lower surface of the jig plate and the end face of the workpiece; and wherein the movable means includes means for moving the support element in the horizontal direction between the polishing board and the cleaning section to polish the end face of the ferrule and to clean the end face of the workpiece and the lower surface of the jig board, respectively.

14. An end face polishing apparatus according to claim 13; wherein the cleaning section comprises a cleaning brush; and further comprising means for rotating the cleaning brush when the support element is moved to the cleaning section to clean the end face of the workpiece and the lower surface of the jig board.

15. An end face polishing apparatus according to claim 13; further comprising a drive mechanism for rotating and revolving the polishing board when the end face of the workpiece is brought into pressure contact with the polishing film of the polishing member to polish the end face of the workpiece.

16. An end face polishing apparatus according to claim 15; wherein the drive mechanism has stop position controlling means for stopping movement of the polishing board at a predetermined position.

17. An end face polishing apparatus according to claim 8; further comprising a drive mechanism for rotating and revolving the polishing board when the end face of the workpiece is brought into pressure contact with the polishing film of the polishing member to polish the end face of the workpiece.

18. An end face polishing apparatus comprising: a jig board for supporting a plurality of ferrules each fixed to an end of a respective optical fiber; a polishing board; a polishing member detachably arranged on the polishing board and having a polishing film for polishing end faces of the optical fibers and ferrules while the optical fibers and ferrules are supported by the jig board; a first holding device for holding a plurality of unused polishing members each having a new polishing film preliminarily attached thereto; at least one second holding device for holding used polishing members which have been removed from the polishing board; and polishing member exchanging means mounted for linear movement in horizontal and vertical directions for exchanging a used polishing member arranged on the polishing board with an unused polishing member by taking the used polishing member from the polishing board and conveying the used polishing member to the second holding device and by taking an unused polishing member from the first holding device and placing the unused polishing member on the polishing board, the polishing member exchanging means comprising a movable member supported for undergoing linear movement in the horizontal direction, an elevating member supported by the movable member for undergoing linear movement therewith in the horizontal direction and for undergoing linear movement in the vertical direction, a support arm having a first end portion connected to the elevating member for undergoing movement in the horizontal and vertical directions and a second end portion, and a support member connected to the second end portion of the support arm for undergoing movement in the horizontal and vertical directions and for supporting each of the used polishing member and the unused polishing member from a lower surface thereof during the exchange of the polishing member.

19. An end face polishing apparatus according to claim 18; wherein each of the used and unused polishing members has a flange portion disposed at an outer peripheral portion of the lower surface thereof so that the support member engages the flange portion of the polishing member during interchange of the polishing members.

\* \* \* \* \*